United States Patent
Liu et al.

(10) Patent No.: US 11,565,886 B2
(45) Date of Patent: Jan. 31, 2023

(54) WHEEL TRANSFER DEVICE

(71) Applicant: CITIC Dicastal Co., Ltd., Qinhuangdao (CN)

(72) Inventors: Jianfeng Liu, Qinhuangdao (CN); Kebin Wang, Qinhuangdao (CN); Jianwei Chen, Qinhuangdao (CN); Shaodong Jiang, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 17/387,962

(22) Filed: Jul. 28, 2021

(65) Prior Publication Data

US 2022/0097979 A1    Mar. 31, 2022

(30) Foreign Application Priority Data

Sep. 30, 2020  (CN) .......................... 202022206610.0

(51) Int. Cl.
*B65G 17/20* (2006.01)
*B65G 43/06* (2006.01)

(52) U.S. Cl.
CPC ............. *B65G 43/06* (2013.01); *B65G 17/20* (2013.01)

(58) Field of Classification Search
CPC ................................ B65G 17/20; B65G 46/06
USPC ........................................................ 198/687
See application file for complete search history.

(56) References Cited

U.S. PATENT DOCUMENTS

| | | | | |
|---|---|---|---|---|
| 3,927,760 A | * | 12/1975 | McCall | B65G 17/20 105/154 |
| 4,433,627 A | * | 2/1984 | Forshee | B61B 13/04 105/154 |
| 4,471,867 A | * | 9/1984 | Forshee | B65G 21/22 104/111 |
| 4,942,956 A | * | 7/1990 | Acker | B65G 47/61 104/162 |
| 5,285,889 A | * | 2/1994 | McDonald | B61B 10/02 198/733 |
| 5,361,890 A | * | 11/1994 | McDonald | B65G 17/20 198/465.4 |
| 5,363,770 A | * | 11/1994 | Makimura | B61B 10/025 104/172.4 |
| 5,857,556 A | * | 1/1999 | Bonacorsi | E01B 25/24 198/686 |
| 6,241,082 B1 | * | 6/2001 | Vanmeenen | B65G 39/06 198/845 |
| 7,568,575 B2 | * | 8/2009 | Kalantari | F01D 25/285 198/680 |

* cited by examiner

*Primary Examiner* — Douglas A Hess
(74) *Attorney, Agent, or Firm* — IPro, PLLC

(57) ABSTRACT

Disclosed is a wheel transfer device which can effectively prevent derailment of rolling wheels caused by breakage of a driving chain, to avoid falling of a wheel hub, thereby not only ensuring the finished product ratio of the wheel hub, and more importantly, ensuring the work safety of the workers.

9 Claims, 2 Drawing Sheets

WHEEL TRANSFER DEVICE

FIELD

The present disclosure relates to the technical field of wheels, in particular to a wheel transfer device.

BACKGROUND

In manufacturing of automobile aluminum alloy wheels, a die-casting process, a machining process and a spray-coating process are included. The spray-coating process includes pretreatment, spray coating and drying. Wheels need to be transferred to the next process a workshop to be subjected to the next process after being subjected to one process. Due to the workshop structure, equipment placement, obstacle avoidance and other reasons, it is inevitable to climb and transfer.

Wheel transfer of the spray-coating process is conducted through an I-shaped guide rail throughout the production line. The I-shaped guide rail is provided with a plurality of rolling wheels for driving a wheel hanging tool to move forward. The rolling wheels are driven by a driving chain to walk. In the prior art, when the driving chain is broken due to mechanical fatigue, the rolling wheels in climbing are pulled by the wheel gravity to reversely roll, so that it is liable to derail the rolling wheels, and the wheel and the wheel hanging tool fall off therewith, thereby making the wheel fall to the ground to reduce the finished product ratio, and more seriously, leading to the safety accident of workers.

SUMMARY

In view of this, the present disclosure aims to provide a wheel transfer device, which can ensure the finished product ratio of the wheel and ensure the work safety of the workers.

To achieve the above objective, the technical solution of the present disclosure is implemented as follows:

a wheel transfer device includes an I-shaped guide rail, wherein the I-shaped guide rail is provided with lifting lugs for hanging a wheel and capable of moving forward and backward along the I-shaped guide rail; a driving chain passes through the lifting lugs and is capable of driving the lifting lugs to move forward along the I-shaped guide rail; and the I-shaped guide rail is further provided with non-return units which are capable of preventing the driving chain from moving backward.

In some embodiments, the non-return units include non-return rotating plates which are hinged to the I-shaped guide rail, wherein the non-return rotating plates include outward-convex arc portions and right-angle portions, the arc portions are in contact with the I-shaped guide rail when the driving chain moves forward, and the right-angle portions abut against the I-shaped guide rail and are capable of preventing the driving chain from moving backward when the driving chain moves backward.

In some embodiments, non-return components which pass through the driving chain are arranged below the non-return rotating plates.

In some embodiments, plumb bodies are hung on the non-return units.

In some embodiments, the non-return rotating plates are fixedly connected to the non-return components through U-shaped connecting plates.

In some embodiments, the lifting lugs include lifting columns and lifting hooks connected to lower parts of the lifting columns, wherein the lifting columns pass through driving chain.

In some embodiments, the driving chain includes transverse lock catches and longitudinal lock catches, which are occluded sequentially and alternately, and the lifting columns penetrate through through holes of the transverse lock catches and are hinged to the lifting hooks.

In some embodiments, the I-shaped guide rail is provided with rolling wheels, the rolling wheels are hinged to U-shaped connecting pieces through pin shafts, and lower parts of the U-shaped connecting pieces are fixedly connected to the lifting lugs.

In some embodiments, the lifting lugs are further provided with anti-fouling chain pieces.

Compared with the prior art, the wheel transfer device provided by the present disclosure has the following advantages:

the wheel transfer device disclosed by the present disclosure is capable of effectively preventing derailment of the rolling wheels caused by breakage of the driving chain to avoid falling of the wheel, thereby ensuring the finished product ratio of the wheel, and more importantly, ensuring the work safety of the workers.

BRIEF DESCRIPTION OF THE DRAWINGS

The accompanying drawings constituting a part of the present disclosure are used to provide further understanding of the present disclosure. The exemplary embodiments of the present disclosure and the descriptions thereof are used to explain the present disclosure and do not constitute an improper limitation to the present disclosure. In the accompanying drawings.

DESCRIPTION OF REFERENCE NUMERALS

1—I-shaped guide rail, 2—rolling wheel, 3—pin shaft, 4—U-shaped connecting piece, 5—lifting lug, 51—lifting hook, 52—lifting column, 6—wheel hanging piece, 7—driving chain, 8—non-return unit, 81—non-return rotating plate, 82—arc portion, 83—right-angle portion, 84—non-return component, 85—U-shaped connecting plate, 86—plumb body, 9—anti-fouling chain piece

DETAILED DESCRIPTION OF THE EMBODIMENTS

It should be noted that the embodiments in the present disclosure and features in the embodiments may be combined with each other without conflict.

The technical solutions of the present disclosure will be clearly and completely described below with reference to the accompanying drawings and the embodiments. Apparently, the described embodiments are merely but not all of the embodiments of the present disclosure. All other embodiments obtained by a person of ordinary skill in the art based on the embodiments of the present disclosure without creative efforts shall fall within the protection scope of the present disclosure.

Figure 2:
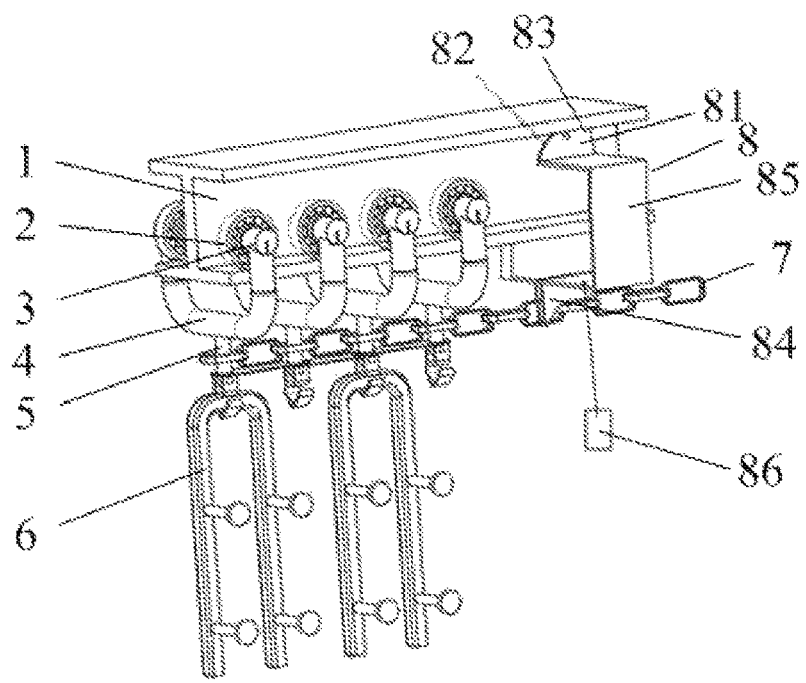
FIG. 2 is a three-dimensional schematic diagram of a wheel transfer device of the present disclosure.
Figure 3:
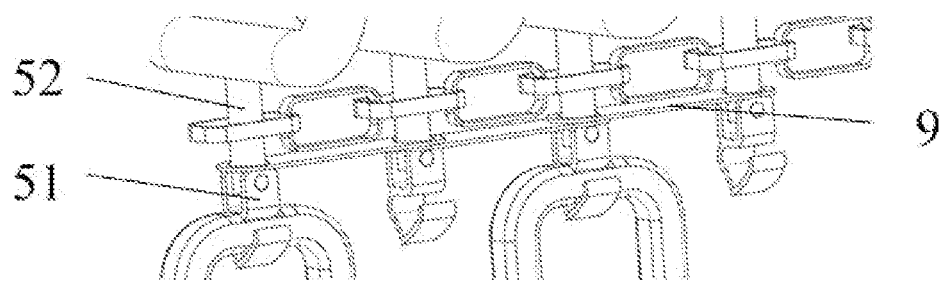
FIG. 3 is a partial schematic diagram of a wheel transfer device of the present disclosure.

A wheel transfer device of the embodiments of the present disclosure is described below with reference to FIG. 1 to FIG. 3 and the embodiments.

Figure 1:
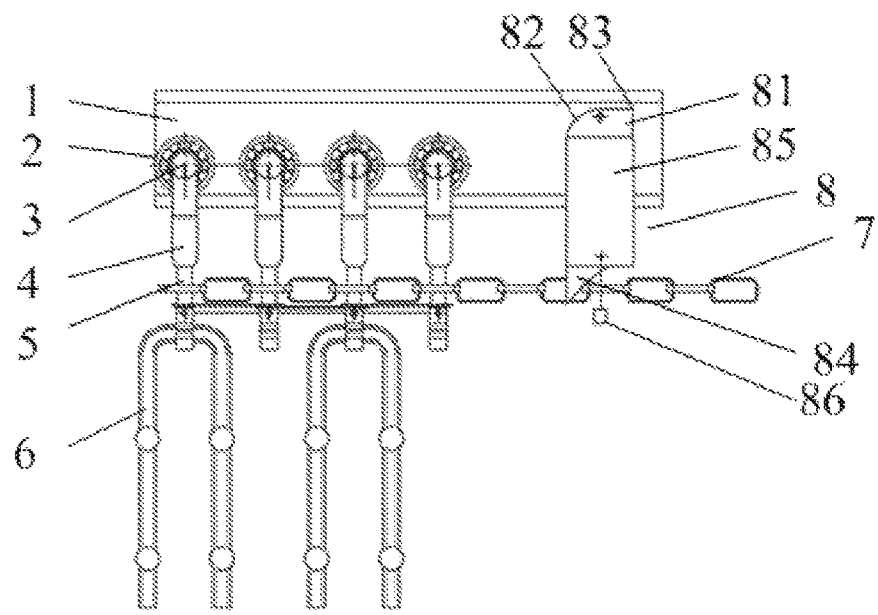
FIG. 1 is a front view of a wheel transfer device of the present disclosure.

A wheel transfer device, as shown in FIG. 1, includes an I-shaped guide rail 1 with an I-shaped section, wherein rolling wheels 2 which are matched with a lower edge of the I-shaped guide rail 1 are arranged on lower edges of two sides of the I-shaped guide rail 1 respectively, pin shafts 3 extending outward by a certain length are arranged at axle centers of the two rolling wheels 2, and the pin shafts 3 are connected to the rolling wheels 2 through bearings.

Upwardly directed U-shaped connecting pieces 4 are arranged below the I-shaped guide rail 1, two ends of each of the U-shaped connecting piece 4 are fixedly connected to outer edges of the two pin shafts 3 respectively, downwardly directed lifting lugs 5 are fixedly arranged at center positions of lower parts of the U-shaped connecting piece 4, lifting hooks 51 are arranged on lower parts of the lifting lugs 5, and wheel hanging pieces are hung on the lifting hooks 51. The wheel transfer device further includes a driving chain 7, wherein the driving chain 7 includes transverse lock catches and longitudinal lock catches, which are occluded sequentially and alternately, and the transverse lock catches of the driving chain are buckled on the lifting lugs 5.

The I-shaped guide rail 1 is provided with non-return units 8 which are symmetrically arranged on the two sides of the I-shaped guide rail 1, the non-return unit 8 includes non-return rotating plates 81 arranged on a longitudinal beam of the I-shaped guide rail through pivot pins, arc portions 82 are arranged on one side of the non-return rotating plates 81 along a forward direction of the rolling wheels 2, right-angle portions 83 are arranged on one side of the non-return rotating plates 81 along a backward direction of the rolling wheels 2, upper edges of the non-return rotating plates 81 are close to a lower surface of an upper edge of the I-shaped guide rail 1, the arc portions are in contact with the I-shaped guide rail 1 when the driving chain 7 moves forward, and the right-angle portions 83 abut against the I-shaped guide rail to be capable of preventing the driving chain from moving backward when the driving chain 7 moves backward.

In some embodiments, non-return components 84 which pass through the driving chain 7 are arranged below the non-return rotating plates 81. Lower parts of the non-return units 8 include the non-return components 84, wherein the non-return components 84 are of right-angled triangle structures which penetrate into the transverse lock catches of the driving chain 7 and are arranged longitudinally, and one right-angle side of each of the non-return components 84 faces upward and the other right-angle side of each of the non-return components 84 faces toward a moving direction of the rolling wheels 2. Middle parts of the non-return units 8 include U-shaped connecting plates 85 which are bended toward an outer side direction of the I-shaped guide rail 1, wherein openings of the U-shaped connecting plates 85 face toward an inner side of the I-shaped guide rail 1, and a gap is reserved between the U-shaped connecting plates 85 and the I-shaped guide rail 1 for the rolling wheels 2 and the U-shaped connecting pieces 4 to pass through. The non-return rotating plates 81, the U-shaped connecting plates 85 and the non-return components 84 are in an integrally formed structure. A gap for the lifting lugs 5 and the longitudinal lock catches of the driving chain 7 to pass through is reserved between the non-return components 84 of the two symmetrically arranged non-return units 8.

A driving process of the embodiment is as follows: a driving motor drives the driving chain 7 to move along the I-shaped guide rail 1. Since the transverse lock catches of the driving chain 7 are buckled on the lifting lugs 5, the lifting lugs 5 are driven by the driving chain 7 to push the rolling wheels 2 to rotate forward to finally drive the wheel to move forward along with the wheel hanging pieces 6.

Since the embodiment is applied to the I-shaped guide rail 1 in climbing, description is conducted with the climbing portion. When the driving chain 7 moves forward, since the arc portions 82 are arranged on one side of the non-return rotating plates 81 along the forward direction of the rolling wheels 2, the non-return units 8 are capable of freely swinging forward, and the non-return units 8 on the two sides of the I-shaped guide rail 1 swing forward by a certain angle under the collision of the driving chain 7, then fall, swing again and fall again, and perform the actions repeatedly. After the driving chain 7 is broken, the rolling wheels in climbing are subjected to the wheel gravity and roll reversely. Since the right-angle portions 83 are arranged on one side of the non-return rotating plates 81 along the backward direction of the rolling wheels 2 and is close to the upper edge of the I-shaped guide rail 1, after the non-return units 8 swing backward by a small angle, right-angle edges of the non-return rotating plates 81 may be clamped on the lower edge of the I-shaped guide rail 1. Since the right-angle sides located at the front ends of the non-return components 84 clamp the lock catches of the driving chain 7, the driving chain 7 does not move backward under the non-return action of the non-return units 8, so that the rolling wheels 2 do not roll backward and the rolling wheels 2 do not derail.

In some embodiments, the lifting lugs 5 include lifting columns 52 and lifting hooks 51 fixedly arranged on lower parts of the lifting columns. Transversely arranged anti-fouling chain pieces 9 are arranged between any two adjacent lifting columns 52. Through holes for the lifting columns 52 to pass through are formed in two ends of each of the anti-fouling chain pieces 9 respectively.

In the embodiment, the anti-fouling chain pieces 9 move along with the movement track of the driving chain 7, and the anti-fouling chain pieces 9 suspend above the lifting hooks 51 and may recover oil drip generated by lubrication of the chain, and rust and other impurities generated by abrasion of the chain and the rail. Therefore, the fact that the surfaces and the outer rims of the wheels are liable to be polluted by impurities such as oil and scrap iron is avoided to ensure the manufacturing quality of the wheel.

In order to ensure that the non-return units 8 fall smoothly, plumb bodies 86 are hung on the U-shaped connecting plates 85 of the non-return units 8. Under the conditions of chain breakage and the like, the non-return units automatically performs return resistance through the gravity of the non-return units and the gravity of the plumb bodies, such that damage to equipment caused by falling of the whole device is avoided, equipment failure time is shortened, and the operation cost of a factory is greatly reduced.

In some embodiments, detachable high-temperature oil-absorbing cotton is fixed on the anti-fouling chain pieces 9. In the embodiment, single chain piece is adopted, and continuously absorbs oil dirt and scrap iron along with the movement of the driving chain 7.

In some embodiments, the lifting lugs are J-shaped hooks or S-shaped hooks. A material of the non-return units is No. 45 steel.

Compared with the prior art, the wheel transfer device provided by the present disclosure has the following advantages:

the wheel transfer device disclosed by the present disclosure is capable of effectively preventing derailment of the rolling wheel caused by breakage of the driving chain to avoid falling of the wheel, thereby ensuring the finished product ratio of the wheel, and more importantly, ensuring the work safety of the workers.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

In the description of the present invention, it should be understood that the terms "center", "longitudinal", "transverse", "front", "rear", "left", "right", "vertical", "horizontal", "top", "bottom", "inner", "outer", and the like indicate orientations or positional relationships based on the drawings. The terms are only for description convenience of the present invention and simplification of the description, but do not indicate or imply that the pointed apparatuses or elements must have specific orientations or be constructed and operated in specific orientations. Therefore, the terms should not be understood to limit the present invention.

Furthermore, the terms "first" and "second" are only for the aim of description, and cannot be understood as indicating or implying the relative importance or implicitly indicating the quantity of the indicated technical features. Thus, the features defined with "first" and "second" may explicitly or implicitly comprise one or more of these features. In the description of the present invention, "a plurality of" means at least two, e.g., two, three, etc., unless otherwise specified.

In the present invention, unless otherwise specified and defined, the terms "mounted", "joined", "connected", "fixed" and the like should be understood in a broad sense, for example, being fixedly connected, detachably connected, integrated; mechanically connected, electrically connected, mutually communicated; directly connected, indirectly connected by a medium, communication of interiors of two components or interaction of two components. A person of ordinary skill in the art could understand the specific meanings of the above terms in the present invention according to specific circumstances.

The foregoing descriptions are merely preferred embodiments of the present invention, but are not intended to limit the present invention. Any modification, equivalent substitution, improvement and the like made within the spirit and principle of the present invention shall fall within the protection scope of the present invention.

What is claimed is:

1. A wheel transfer device, comprising an I-shaped guide rail, wherein the I-shaped guide rail is provided with a lifting lug for hanging a wheel and capable of moving along the I-shaped guide rail; a driving chain passes through the lifting lug and is capable of driving the lifting lug to move forward along the I-shaped guide rail; and the I-shaped guide rail is further provided with a non-return unit which is capable of preventing the driving chain from moving backward, wherein the non-return unit comprises a non-return rotating plate which is hinged to the I-shaped guide rail, the non-return rotating plate comprises an outward-convex arc portion and a right-angle portion, the arc portion is in contact with the I-shaped guide rail when the driving chain moves forward, and the right-angle portion abuts against the I-shaped guide rail to be capable of preventing the driving chain from moving backward when the driving chain moves backward.

2. The wheel transfer device according to claim 1, wherein a non-return component which passes through the driving chain is arranged below the non-return rotating plate.

3. The wheel transfer device according to claim 2, wherein a plumb body is hung on the non-return unit.

4. The wheel transfer device according to claim 3, wherein the non-return rotating plate is fixedly connected to the non-return component through a U-shaped connecting plate.

5. The wheel transfer device according to claim 4, wherein the lifting lug comprises a lifting column and a lifting hook connected to a lower part of the lifting column, and the lifting column passes through the driving chain.

6. The wheel transfer device according to claim 5, wherein the driving chain comprises a transverse lock catch and a longitudinal lock catch which are occluded sequentially and alternately, and the lifting column penetrates through a through hole of the transverse lock catch and is hinged to the lifting hook.

7. The wheel transfer device according to claim 6, wherein the I-shaped guide rail is provided with a rolling wheel, the rolling wheel is hinged to a U-shaped connecting piece through a pin shaft, and a lower part of the U-shaped connecting piece is fixedly connected to the lifting lug.

8. The wheel transfer device according to claim 7, wherein the lifting lug is further provided with an anti-fouling chain piece.

9. The wheel transfer device according to claim 6, wherein the non-return component comprises a right-angled triangle structure which penetrates into the transverse lock catch of the driving chain and is arranged longitudinally.

* * * * *